United States Patent
Zhang et al.

(10) Patent No.: US 11,498,603 B2
(45) Date of Patent: Nov. 15, 2022

(54) STEERING COLUMN AND VEHICLE

(71) Applicant: BYD COMPANY LIMITED, Guangdong (CN)

(72) Inventors: Peng Zhang, Shenzhen (CN); Chenggang Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/058,599

(22) PCT Filed: May 28, 2019

(86) PCT No.: PCT/CN2019/088836
§ 371 (c)(1),
(2) Date: Nov. 24, 2020

(87) PCT Pub. No.: WO2019/228355
PCT Pub. Date: Dec. 5, 2019

(65) Prior Publication Data
US 2021/0213996 A1    Jul. 15, 2021

(30) Foreign Application Priority Data

May 31, 2018 (CN) .......................... 201810553426.8
May 31, 2018 (CN) .......................... 201820840740.X

(51) Int. Cl.
*B62D 1/181* (2006.01)
*B62D 1/187* (2006.01)
*F16H 25/20* (2006.01)

(52) U.S. Cl.
CPC .............. *B62D 1/181* (2013.01); *B62D 1/187* (2013.01); *F16H 25/20* (2013.01); *F16H 2025/2084* (2013.01)

(58) Field of Classification Search
CPC ........ B62D 1/187; B62D 1/189; B62D 1/181; F16H 25/20; F16H 2025/2084
See application file for complete search history.

(56) References Cited

U.S. PATENT DOCUMENTS

| 5,178,411 A | 1/1993 | Fevre et al. |
| 6,390,505 B1 * | 5/2002 | Wilson ................... B62D 1/181 280/775 |

(Continued)

FOREIGN PATENT DOCUMENTS

| CN | 204432743 U | 7/2015 |
| CN | 205010305 U * | 2/2016 |

(Continued)

OTHER PUBLICATIONS

Chi, A Electric Adjusting Mechanism Of Steering Pipe Column, Feb. 3, 2016, EPO, CN 205010305 U, Machine Translation of Description (Year: 2016).*

(Continued)

*Primary Examiner* — Paul N Dickson
*Assistant Examiner* — Matthew D Lee
(74) *Attorney, Agent, or Firm* — Fenwick & West LLP

(57) ABSTRACT

A steering column includes a steering shaft, a fixing bracket, a first cylinder, a second cylinder, an angle adjustment motor, an angle adjustment screw-nut assembly, a linkage assembly, a height adjustment motor, and a height adjustment screw-nut assembly, where the second cylinder is slidably sleeved with the first cylinder, the steering shaft runs through the first and second cylinders, the steering shaft includes an upper shaft and a lower shaft that are in splined connection, the upper shaft is supported in the second cylinder through a first bearing, the lower shaft is supported in the first cylinder through a second bearing, the first cylinder is hinged to the fixing bracket, the angle adjustment motor can drive the first cylinder to rotate relative to the (Continued)

fixing bracket, and the height adjustment motor can drive the second cylinder to axially move relative to the first cylinder.

18 Claims, 14 Drawing Sheets

(56) References Cited

U.S. PATENT DOCUMENTS

| | | | |
|---|---|---|---|
| 8,146,945 B2 * | 4/2012 | Born | B62D 1/181 |
| | | | 280/775 |
| 9,849,904 B2 * | 12/2017 | Rouleau | B62D 1/183 |
| 2009/0000417 A1 * | 1/2009 | Oshita | B62D 1/185 |
| | | | 74/493 |
| 2009/0100956 A1 * | 4/2009 | Warashina | B62D 1/181 |
| | | | 74/493 |
| 2012/0247259 A1 * | 10/2012 | Mizuno | B62D 1/181 |
| | | | 74/493 |
| 2013/0160597 A1 * | 6/2013 | Masuda | B62D 1/181 |
| | | | 74/493 |
| 2014/0305252 A1 | 10/2014 | Mizuno | |
| 2017/0120944 A1 | 5/2017 | Kato | |
| 2018/0079445 A1 * | 3/2018 | Kato | B62D 5/0409 |
| 2018/0141581 A1 * | 5/2018 | Kato | F16H 1/203 |
| 2020/0039567 A1 * | 2/2020 | Sekiguchi | B62D 1/181 |
| 2022/0048556 A1 * | 2/2022 | Kim | B62D 1/185 |

FOREIGN PATENT DOCUMENTS

| | | | | |
|---|---|---|---|---|
| CN | 205010305 U | | 2/2016 | |
| CN | 205706835 U | | 11/2016 | |
| CN | 205836915 U | | 12/2016 | |
| CN | 208241506 U | * | 12/2018 | |
| CN | 208376861 U | | 1/2019 | |
| CN | 208376862 U | | 1/2019 | |
| CN | 208376863 U | | 1/2019 | |
| CN | 208376864 U | | 1/2019 | |
| CN | 208376866 U | | 1/2019 | |
| CN | 208376867 U | | 1/2019 | |
| CN | 208530677 U | | 2/2019 | |
| CN | 208530680 U | | 2/2019 | |
| CN | 110001755 A | * | 7/2019 | B62D 1/187 |
| EP | 0461025 A1 | | 12/1991 | |
| EP | 0580319 A1 | * | 1/1994 | |
| EP | 2055611 A1 | | 5/2009 | |
| EP | 3162655 A1 | | 5/2017 | |
| JP | 2008024243 A | | 2/2008 | |
| JP | 2012218455 A | | 11/2012 | |
| JP | 2015077828 A | | 4/2015 | |
| JP | 2015140124 A | | 8/2015 | |
| JP | 2017081515 A | | 5/2017 | |

OTHER PUBLICATIONS

PCT International Search Report, PCT/CN2019/088836, dated Aug. 2, 2019, 6 Pages.

* cited by examiner

STEERING COLUMN AND VEHICLE

CROSS-REFERENCE TO RELATED APPLICATIONS

This application is the National Stage of International Application No. PCT/CN2019/088836, "Steering Column and Vehicle," filed on May 28, 2019, which claims priority to Chinese Patent Applications No. 201810553426.8, filed on May 31, 2018, and 201820840740.X, filed on May 31, 2018. The entire content of all of the above-referenced applications are incorporated herein by reference.

FIELD

The present disclosure relates to a vehicle steering system, and specifically, to a steering column and a vehicle having the steering column.

BACKGROUND

The utility model patent with publication number CN205706835U discloses an electric four-way adjustment steering column mechanism. Such an electric four-way adjustment steering column mechanism is relatively simple in structure, with relatively poor adjustment displacement precision, relatively poor reliability, and generates relatively large noises in the adjustment process. Core components such as an adjustment motor and a controller are relatively poor in compactness, and are easily damaged as force-bearing levers. Both the overall structure and the product feasibility are relatively poor, and the quality of the steering column mechanism cannot be effectively guaranteed.

SUMMARY

An objective of the present disclosure is to provide a steering column that can simultaneously implement height adjustment and angle adjustment, and the adjustment precision of the steering column is relatively high.

To achieve the foregoing objective, the present disclosure provides a steering column, including a steering shaft, a fixing bracket, a first cylinder, a second cylinder, an angle adjustment motor, an angle adjustment screw-nut assembly, a linkage assembly, a height adjustment motor, and a height adjustment screw-nut assembly, where the second cylinder is arranged in the first cylinder and is slidably sleeved with the first cylinder, the steering shaft runs through the first cylinder and the second cylinder, the steering shaft includes an upper shaft and a lower shaft that are in splined connection, the upper shaft is supported in the second cylinder through a first bearing, the lower shaft is supported in the first cylinder through a second bearing, the first cylinder is hinged to the fixing bracket around a first hinge axis, the angle adjustment motor can drive, through the angle adjustment screw-nut assembly and the linkage assembly, the first cylinder to rotate relative to the fixing bracket, and the height adjustment motor can drive, through the height adjustment screw-nut assembly, the second cylinder to axially move relative to the first cylinder.

In some embodiments, the angle adjustment screw-nut assembly includes an angle adjustment screw and an angle adjustment nut sleeved on the angle adjustment screw, the angle adjustment screw is connected to the angle adjustment motor, the angle adjustment nut is connected to the fixing bracket through the linkage assembly, one connecting rod of the linkage assembly is hinged to the first cylinder around a second hinge axis, and the first hinge axis is parallel to the second hinge axis.

In some embodiments, an axis of the angle adjustment screw is perpendicular to the first hinge axis.

In some embodiments, the steering column further includes an angle adjustment motor base, the angle adjustment motor is fixed on the angle adjustment motor base, the angle adjustment motor base is hinged to the first cylinder around a third hinge axis, and the third hinge axis is parallel to the first hinge axis.

In some embodiments, the linkage assembly includes a first connecting rod and a second connecting rod, a first end of the first connecting rod is hinged to the angle adjustment nut around a fourth hinge axis, a second end of the first connecting rod is hinged to a first end of the second connecting rod, a second end of the second connecting rod is hinged to the fixing bracket around a fifth hinge axis, the first hinge axis, the fourth hinge axis, and the fifth hinge axis are parallel to each other, and the first connecting rod is hinged to the first cylinder around the second hinge axis.

In some embodiments, the first connecting rod has a first hinge point connected to the angle adjustment nut, a second hinge point connected to the first cylinder, and a third hinge point connected to the second connecting rod, where connecting lines between the first hinge point, the second hinge point, and the third hinge point form a triangle.

In some embodiments, there are two linkage assemblys, and the two linkage assemblys are respectively arranged on two sides of the angle adjustment nut.

In some embodiments, the height adjustment screw-nut assembly includes a height adjustment screw and a height adjustment nut sleeved on the height adjustment screw, the height adjustment screw is connected to the height adjustment motor, the height adjustment nut is connected to the second cylinder, and an axis of the height adjustment screw is parallel to an axis of the second cylinder.

In some embodiments, the steering column further includes a height adjustment motor base, the height adjustment motor is fixed on the height adjustment motor base, and the height adjustment motor base is fixed on the first cylinder.

In the steering column of the present disclosure, the angle adjustment screw-nut assembly is configured to convert rotary motion of the angle adjustment motor into rectilinear motion of the angle adjustment nut, and the angle adjustment nut drives, through the linkage assembly, the first cylinder to rotate around the first hinge axis. The cooperation between the angle adjustment screw-nut assembly and the linkage assembly can significantly improve the angle adjustment precision and the motion reliability in the adjustment process. The height adjustment precision can be improved by using the height adjustment screw-nut assembly.

The present disclosure further provides a vehicle, including the foregoing steering column.

Other features and advantages of the present disclosure are described in detail in the following specific implementations.

BRIEF DESCRIPTION OF THE DRAWINGS

The accompanying drawings are used to provide a further understanding of the present disclosure, constitute a part of this specification, and are used, together with the following specific implementations, to explain the present disclosure, but do not constitute limitations to the present disclosure. In the accompanying drawings.

Figure 1:
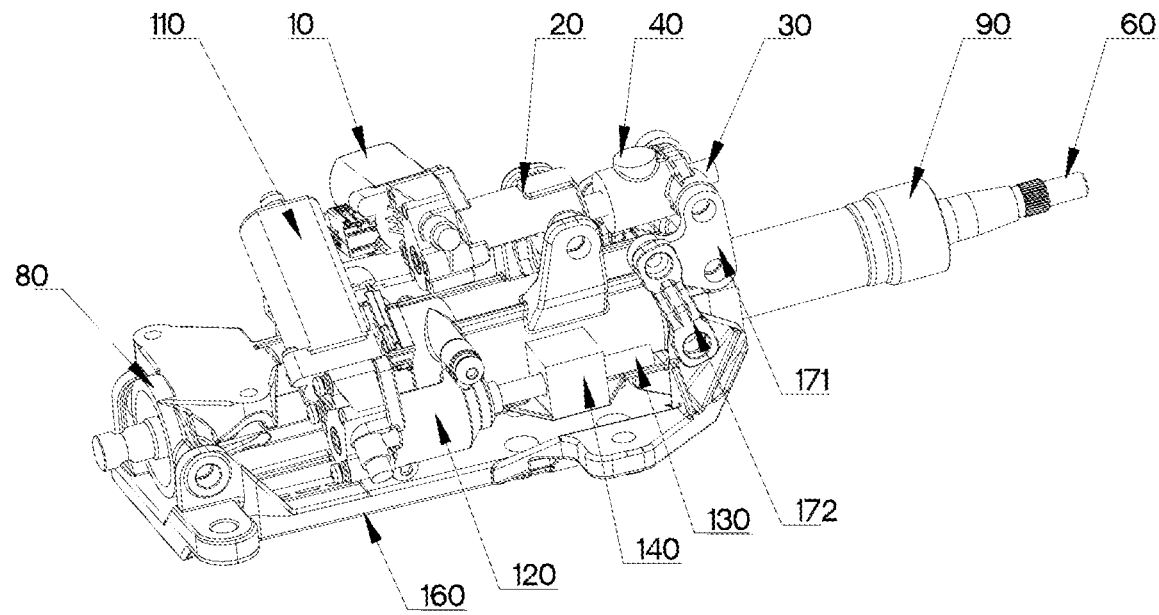
FIG. 1 is a schematic three-dimensional diagram of a steering column according to an implementation of the present disclosure.

| DESCRIPTION OF REFERENCE NUMERALS | |
|---|---|
| 10-angle adjusting motor | 20-angle adjustment motor base |
| 21-second limiting step | 22-third limiting step |
| 30-angle adjustment screw rod | 31-first limiting step |
| 32-first pin hole | 40-angle adjustment nut |
| 41-nut body | 42-screw compression block |
| 43-compression spring | 44-compression nut |
| 411-first threaded hole | 412-second threaded hole |
| 421-small path portion | 422-large path portion |
| 423-step surface | 424-concave surface |
| 425-positioning protrusion | 51-first thrust bearing |
| 52-second thrust bearing | 53-first locking nut |
| 54-first slotted nut | 55-first cotter |
| 56-first carrier bearing | 57-second carrier bearing |
| 58-first limiting retainer ring | 60-steering shaft |
| 61-upper shaft | 62-lower shaft |
| 71-first bearing | 72-second bearing |
| 80-first cylinder | 801-chute |
| 802-mounting lug | 803-annular mounting groove |
| 804-mounting hole | 90-second cylinder |
| 91-sliding cylinder | 92-collapse cylinder |
| 93-collapse ring | 911-second anti-friction coating |
| 912-connecting plate | 913-annular positioning groove |
| 931-protrusion | 100-sliding collar |
| 101-first anti-friction coating | 110-height adjustment motor |
| 120-height adjustment motor base | 121-fifth limiting step |
| 122-sixth limiting step | 130-height adjustment screw |
| 131-fourth limiting step | 132-second pin hole |
| 140-height adjustment nut | 151-third thrust bearing |
| 152-fourth thrust bearing | 153-second locking nut |
| 154-second slotted nut | 155-second cotter |
| 156-third carrier bearing | 157-fourth carrier bearing |
| 158-second limiting retainer ring | 160-fixing bracket |
| 171-first connecting rod | 172-second connecting rod |
| 180-adjustment controller | 191-first bundle |
| 192-second bundle | 200-compression mechanism |
| 201-circlip | 202-disc spring compression piece |
| 203-disc spring | 204-gasket |
| 205-compression block | 211-first fastener |
| 212-second fastener | |

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

According to an aspect of the present disclosure, as shown in FIG. 1 to FIG. 4, a steering column is provided, including a steering shaft 60, a fixing bracket 160, a first cylinder 80, a second cylinder 90, an angle adjustment motor 10, an angle adjustment screw-nut assembly, and a linkage assembly.

The angle adjustment screw-nut assembly includes an angle adjustment screw 30 and an angle adjustment nut 40 sleeved on the angle adjustment screw 30. The fixing bracket 160 is configured to be fixed to a vehicle. The first cylinder 80 is hinged to the fixing bracket 160 around a first hinge axis A-A. The second cylinder 90 is slidably sleeved with the first cylinder 80. The steering shaft 60 runs through the first cylinder 80 and the second cylinder 90.

Figure 4:
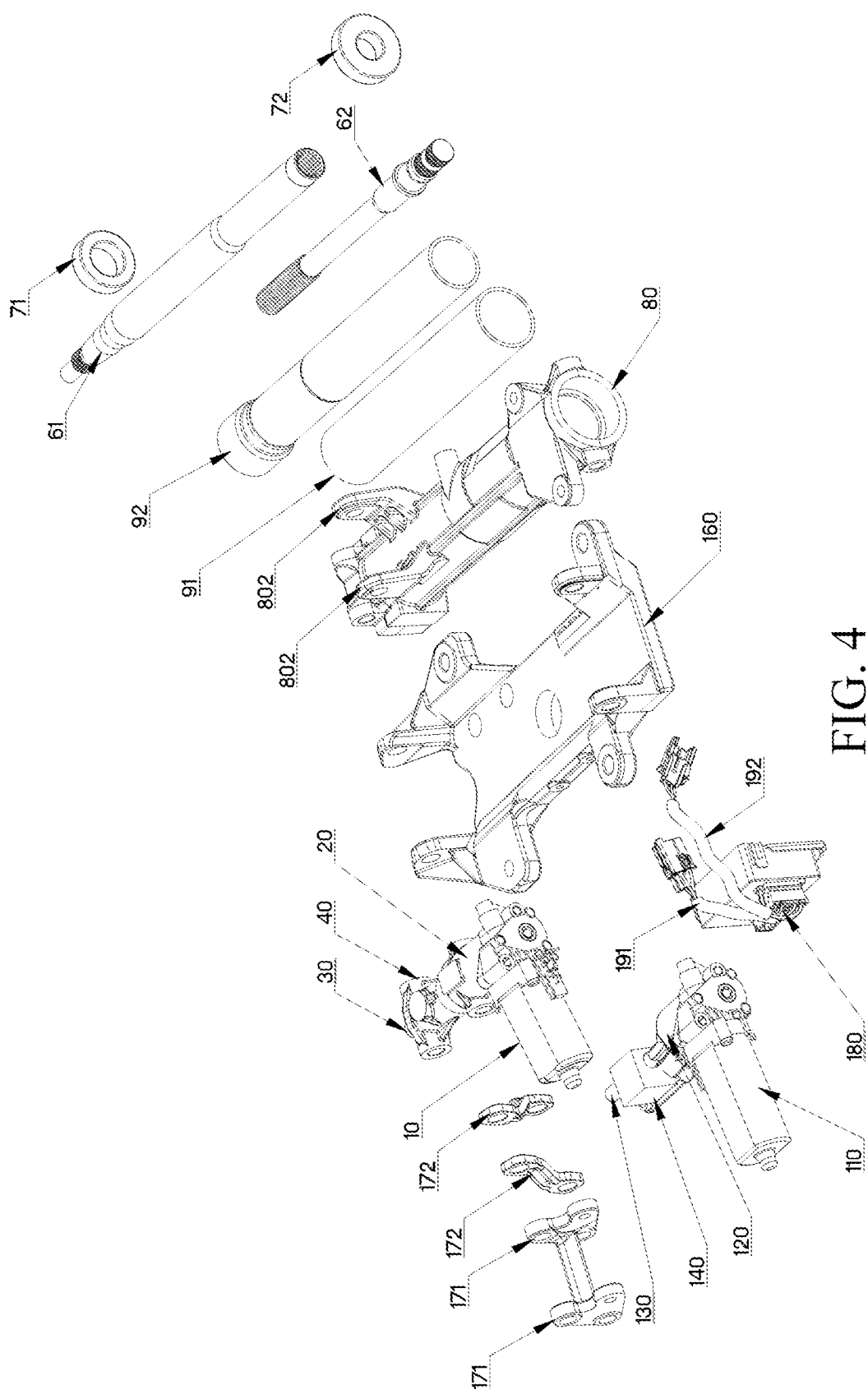
FIG. 4 is a schematic exploded view of a steering column according to an implementation of the present disclosure.
Figure 5:
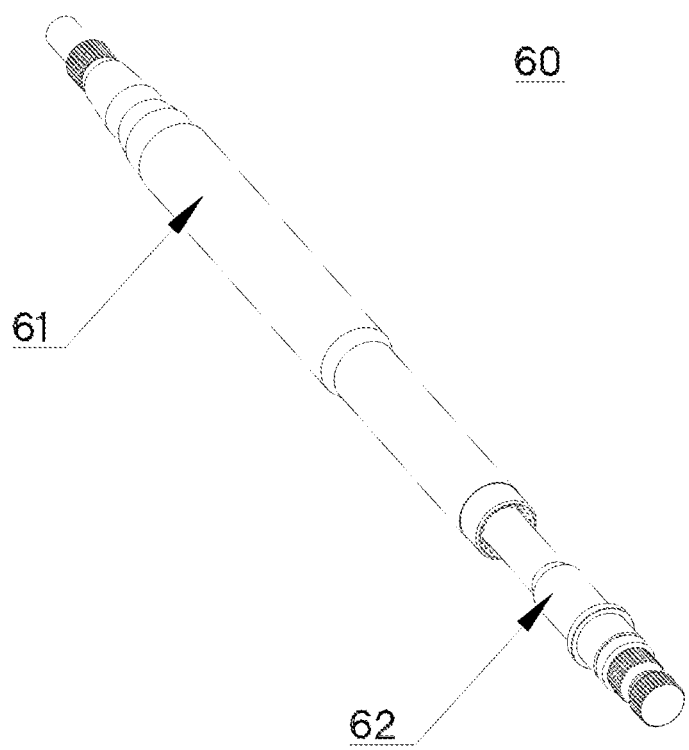
FIG. 5 is a schematic three-dimensional diagram of a steering shaft in a steering column according to an implementation of the present disclosure.

As shown in FIG. 4 and FIG. 5, the steering shaft 60 includes an upper shaft 61 and a lower shaft 62 that are in splined connection. The upper shaft 61 is supported in the second cylinder 90 through a first bearing 71, and the lower shaft 62 is supported in the first cylinder 80 through a second bearing 72. The upper shaft 61 is configured to connect a steering wheel, and the lower shaft 62 is configured to connect a transmission shaft. The angle adjustment motor 10 is configured to drive, sequentially through the angle adjustment screw-nut assembly and the linkage assembly, the first cylinder 80 to rotate relative to the fixing bracket 160, to adjust an angle between the first cylinder 80 and the fixing bracket 160, thereby implementing the angle adjustment function of the steering column.

In the steering column of the present disclosure, the angle adjustment screw-nut assembly is configured to convert rotary motion of the angle adjustment motor 10 into rectilinear motion of the angle adjustment nut 40, and the angle adjustment nut 40 drives, through the linkage assembly, the first cylinder 80 to rotate around the first hinge axis A-A. The cooperation between the angle adjustment screw-nut assembly and the linkage assembly can significantly improve the angle adjustment precision and the motion reliability in the adjustment process.

Further, in an implementation, as shown in FIG. 1 to FIG. 4, the angle adjustment motor 10 is mounted on the first cylinder 80. The angle adjustment screw 30 is connected to the angle adjustment motor 10. The angle adjustment nut 40 is connected to the fixing bracket 160 through the linkage assembly. One connecting rod of the linkage assembly is hinged to the first cylinder 80 around a second hinge axis B-B. The first hinge axis A-A is parallel to the second hinge axis B-B. In this manner, on the one hand, the overall rigidity and reliability of the steering column can be improved, so that the first cylinder 80 can be driven to rotate only when the angle adjustment motor 10 is started, and the first cylinder 80 cannot be shaken by hands or other external forces. On the other hand, a first-order intrinsic modal of the steering column can be improved, and vibration can be alleviated.

In the present disclosure, the angle adjustment screw 30 may be arranged in any proper direction. In an implementation, an axis of the angle adjustment screw 30 may be perpendicular to the first hinge axis A-A, to facilitate motion transmission.

Figure 2:
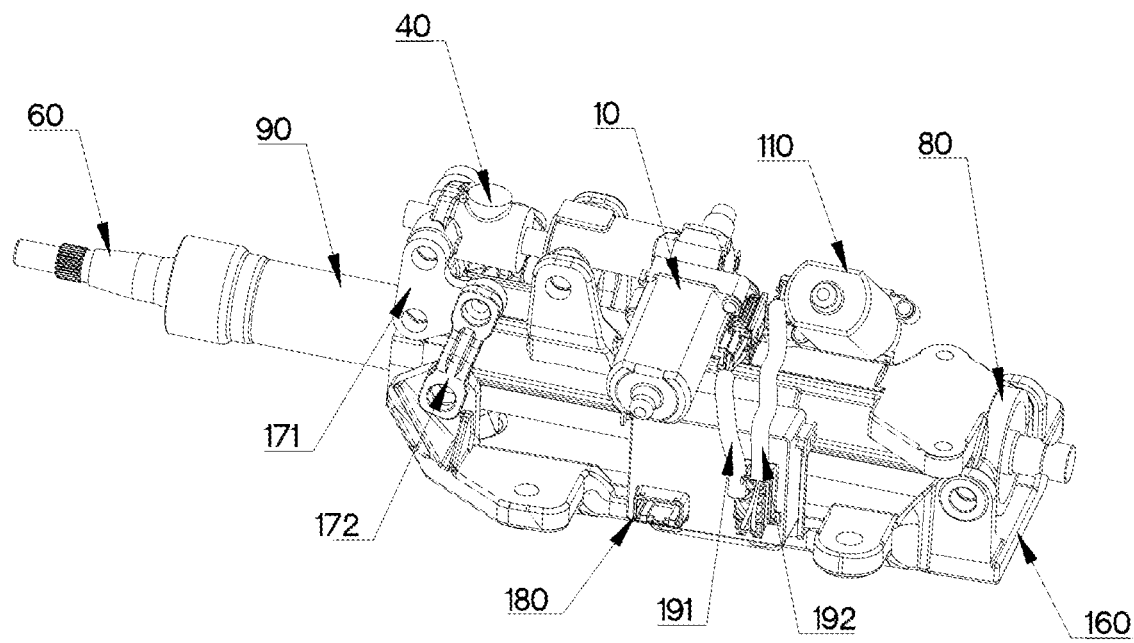
FIG. 2 and FIG. 3 are each a schematic three-dimensional diagram of a steering column from another viewing angle according to an implementation of the present disclosure.
Figure 3:
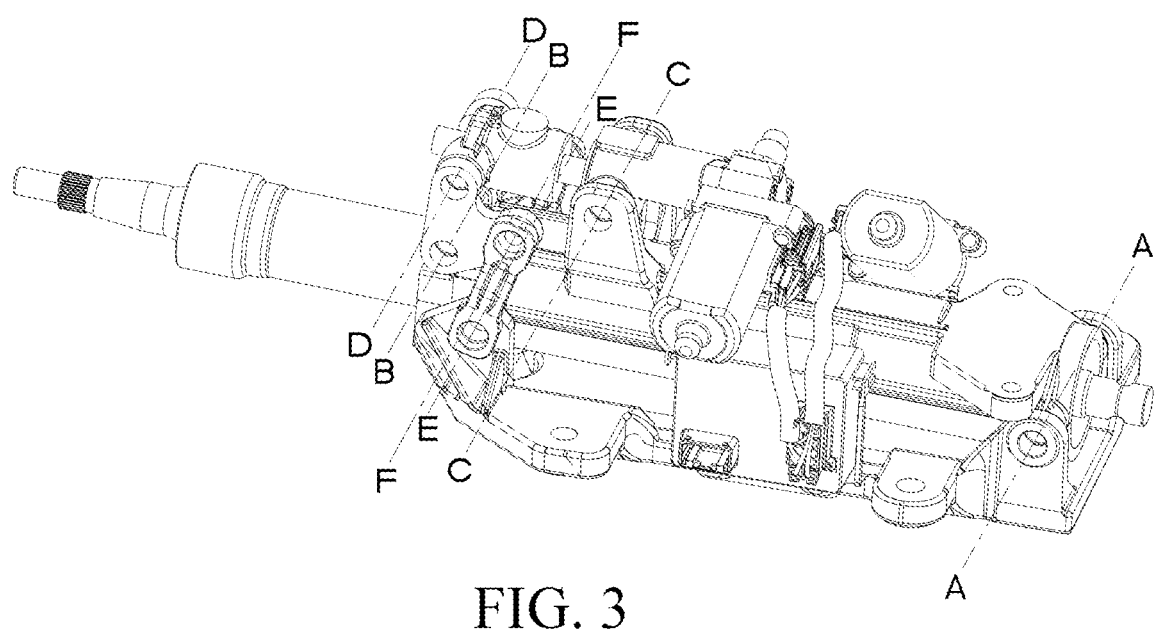

In some embodiments, as shown in FIG. 1 to FIG. 3, the first cylinder 80 may be located between the angle adjustment screw-nut assembly and the fixing bracket 160, so that the structure of the steering column is more compact.

To improve the angle adjustment precision and reduce a driving force required for angle adjustment, in an implementation, as shown in FIG. 1 to FIG. 4, one end portion of the first cylinder 80 is hinged to the fixing bracket 160, and one connecting rod of the linkage assembly is hinged to the other end portion of the first cylinder 80.

Figure 6:
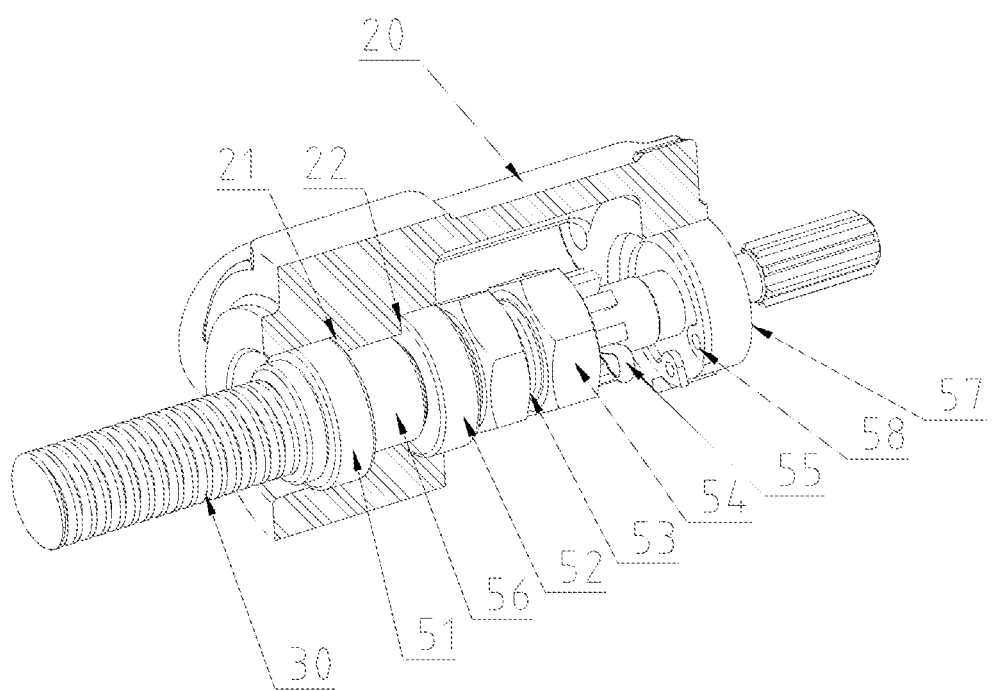
FIG. 6 is a schematic diagram of assembly of an angle adjustment screw and an angle adjustment motor base in a steering column according to an implementation of the present disclosure, where the angle adjustment motor base is shown in a cross-sectional view to show an internal structure.
Figure 7:
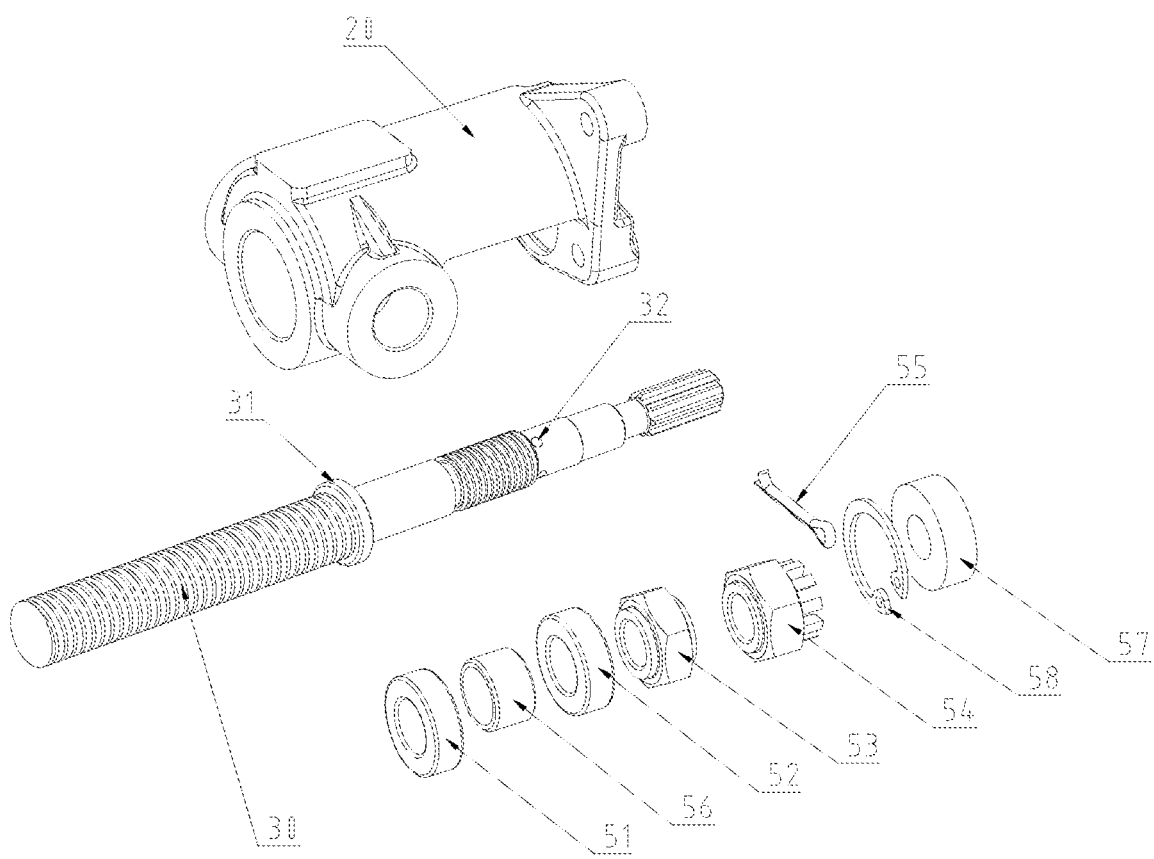
FIG. 7 is a schematic exploded view of an angle adjustment screw and an angle adjustment motor base in a steering column according to an implementation of the present disclosure.

For ease of mounting the angle adjustment motor 10 on the first cylinder 80, in an implementation, as shown in FIG. 1 to FIG. 4, the steering column may further include an angle adjustment motor base 20. The angle adjustment motor 10 is fixed to one end of the angle adjustment motor base 20, and the angle adjustment motor base 20 is mounted on the first cylinder 80. As shown in FIG. 6 and FIG. 7, the angle adjustment screw 30 runs through the angle adjustment motor base 20. The angle adjustment screw 30 is supported in the angle adjustment motor base 20 through a first carrier bearing 56 and a second carrier bearing 57. One end of the angle adjustment screw 30 extends out of the angle adjustment motor base 20 and is in splined connection to the angle adjustment motor 10. The other end of the angle adjustment screw 30 extends out of the angle adjustment motor base 20 and is in threaded fit with the angle adjustment nut 40. The first carrier bearing 56 and the second carrier bearing 57 make the angle adjustment screw 30 unable to move in the radial direction.

In this case, there may be an axial clearance between the angle adjustment screw 30 and the angle adjustment motor base 20, and the clearance may cause the following problems: 1. Abnormal noises during rotation of the angle adjustment screw 30; 2. Deviation between an expected position and an actual position of the angle adjustment nut 40; 3. Shake of the steering wheel.

To eliminate the axial clearance between the angle adjustment screw 30 and the angle adjustment motor base 20, so that the angle adjustment screw 30 cannot move in the axial direction, in an implementation, as shown in FIG. 6 and FIG. 7, a first thrust bearing 51 is arranged on the angle adjustment screw 30. The steering column further includes a first axial compression mechanism. The first axial compression mechanism applies a force to the angle adjustment screw 30, so that the angle adjustment screw 30 and the angle adjustment motor base 20 are compressed through the first thrust bearing 51 in the axial direction. In some embodiments, a first limiting step 31 is formed on the angle adjustment screw 30, a second limiting step 21 is formed on an inner wall of the angle adjustment motor base 20, and two sides of the first thrust bearing 51 respectively abut against the first limiting step 31 and the second limiting step 21.

The first axial compression mechanism may have any proper structure, for example, may include a compression spring. The compression spring is arranged between the angle adjustment motor base 20 and the angle adjustment screw 30, and applies an elastic force in the axial direction to the angle adjustment screw 30, so that the first thrust bearing 51 is clamped by the angle adjustment screw 30 and the angle adjustment motor base 20.

In an implementation, as shown in FIG. 6 and FIG. 7, the first axial compression mechanism includes a second thrust bearing 52 and a first locking nut 53 that are arranged on the angle adjustment screw 30. The second thrust bearing 52 is located between the first thrust bearing 51 and the first locking nut 53. A third limiting step 22 is further formed on the inner wall of the angle adjustment motor base 20. Two sides of the second thrust bearing 52 respectively abut against the third limiting step 22 and the first locking nut 53. The first thrust bearing 51 and the second thrust bearing 52 are located between the first limiting step 31 and the first locking nut 53.

Herein, the first thrust bearing 51 and the second thrust bearing 52 can both bear an axial force and rotate around an axis. The first locking nut 53 is in threaded fit with the angle adjustment screw 30. When the first locking nut 53 is tightened, a distance between the first limiting step 31 and the first locking nut 53 on the angle adjustment screw 30 gradually decreases. If the first locking nut 53 continues to be tightened, a clearance between the first limiting step 31 and the first thrust bearing 51, a clearance between the first thrust bearing 51 and the second limiting step 21, a clearance between the third limiting step 22 and the second thrust bearing 52, and a clearance between the second thrust bearing 52 and the first locking nut 53 will be minimized, that is, there will be no clearance.

To prevent the first locking nut 53 from loosening due to rotation of the angle adjustment screw 30, further, as shown in FIG. 6 and FIG. 7, the first axial compression mechanism further includes a first slotted nut 54 and a first cotter 55 that are arranged on the angle adjustment screw 30. One side of the first locking nut 53 that faces away from the second thrust bearing 52 is fixed through the first slotted nut 54, and the first slotted nut 54 is fixed through the first cotter 55. After the first locking nut 53 is tightened, the first slotted nut 54 is then tightened, and the first cotter 55 is made to penetrate the first slotted nut 54 and is inserted into a first pin hole 32 reserved on the angle adjustment screw 30. The first slotted nut 54 is blocked by the first cotter 55 and will not loosen. Similarly, the first locking nut 53 is blocked by the first slotted nut 54 and will not loosen.

The first carrier bearing 56 and the second carrier bearing 57 may be arranged at any proper positions. In an implementation, as shown in FIG. 6 and FIG. 7, the first carrier bearing 56 is located between the first thrust bearing 51 and the second thrust bearing 52. The second thrust bearing 52, the first locking nut 53, and the first slotted nut 54 are located between the first carrier bearing 56 and the second carrier bearing 57. One side of the second carrier bearing 57 that faces toward the first carrier bearing 56 may be fixed through a first limiting retainer ring 58. The first limiting retainer ring 58 is mounted on the inner wall of the angle adjustment motor base 20. One side of the second carrier bearing 57 that faces away from the first carrier bearing 56 may be limited by the angle adjustment motor 10.

To increase degrees of motion freedom of the angle adjustment motor 10 to make motion transmission smoother, in an implementation, as shown in FIG. 1 to FIG. 3, the angle adjustment motor base 20 is hinged to the first cylinder 80 around a third hinge axis C-C. The third hinge axis C-C is parallel to the first hinge axis A-A.

For ease of mounting the angle adjustment motor base 20, in an implementation, as shown in FIG. 4, a mounting lug 802 is formed on the first cylinder 80. The angle adjustment motor base 20 is hinged to the mounting lug 802 around the third hinge axis C-C. Along the axial direction of the first cylinder 80, the mounting lug 802 is located between two end portions of the first cylinder 80, so that the angle adjustment motor 10 and the angle adjustment motor base 20 are located between the two end portions of the first cylinder 80, and the structure of the steering column is more compact.

There will be some abrasion after the angle adjustment nut 40 moves on the angle adjustment screw 30 for a long time, resulting in a clearance between the angle adjustment nut 40 and the angle adjustment screw 30. On one hand, the clearance causes the angle adjustment nut 40 to vibrate; on the other hand, the clearance causes a driver to feel empty when holding the steering wheel, causing the steering wheel to shake.

Figure 8:
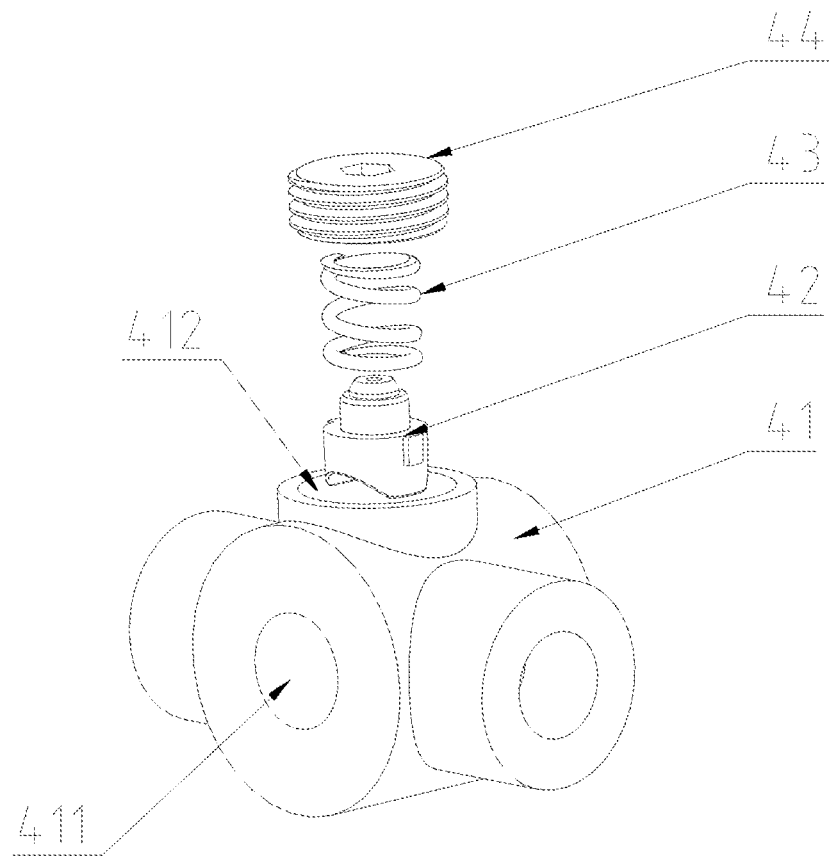
FIG. 8 is a schematic exploded view of an angle adjustment nut in a steering column according to an implementation of the present disclosure.

To eliminate or reduce the clearance between the angle adjustment nut 40 and the angle adjustment screw 30, in an implementation, as shown in FIG. 8, the angle adjustment screw-nut assembly includes an angle adjustment screw 30 and a radial compression mechanism. A nut body 41 is in threaded fit with the angle adjustment screw 30. The radial compression mechanism applies a force along the radial direction of the angle adjustment screw 30 to the angle adjustment screw 30 and/or the nut body 41, so that the nut body 41 is compressed on the angle adjustment screw 30.

In an implementation, one end of the radial compression mechanism is connected to the nut body 41, and the other end acts on the angle adjustment screw 30. In this case, the radial compression mechanism applies forces in opposite directions to the nut body 41 and the angle adjustment screw 30, so that the nut body 41 and the angle adjustment screw 30 are compressed in the radial direction.

The radial compression mechanism may have any proper structure. In an implementation, the radial compression mechanism includes a screw compression block 42, a compression spring 43, and a compression nut 44. A first threaded hole 411 matching the angle adjustment screw 30 and a second threaded hole 412 matching the compression nut 44 are formed on the nut body 41. The first threaded hole 411 is in communication with the second threaded hole 412. The compression spring 43 is arranged between the compression nut 44 and the screw compression block 42 and applies an elastic force to the screw compression block 42, so that the screw compression block 42 is pressed on a side surface of the angle adjustment screw 30.

When the compression nut 44 rotates in a direction of compressing the compression spring 43, the elastic force of the compression spring 43 is transmitted to the angle adjustment screw 30 through the screw compression block 42, so that the clearance between the angle adjustment screw 30 and the angle adjustment nut 40 is reduced or eliminated.

Figure 9:
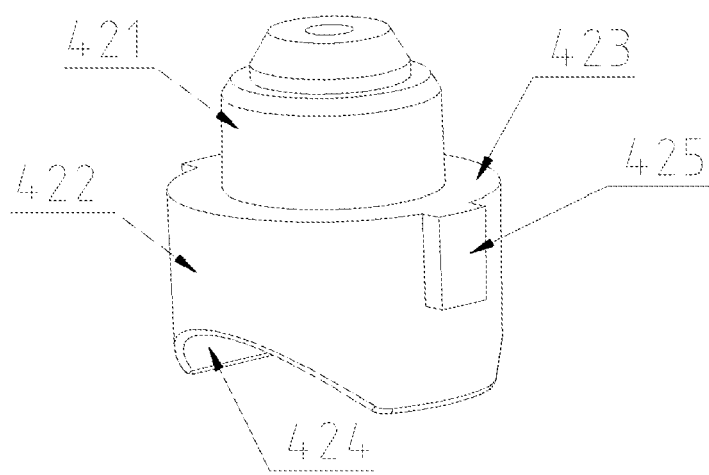
FIG. 9 is a schematic three-dimensional diagram of a screw compression block in a steering column according to an implementation of the present disclosure.

To better implement the compression function, in an implementation, as shown in FIG. 9, the screw compression block 42 has a concave surface 424 matching a threaded cylindrical surface of the angle adjustment screw 30. The screw compression block 42 is pressed on the threaded cylindrical surface of the angle adjustment screw 30 through the concave surface 424.

The screw compression block 42 may have any proper structure. In an implementation, as shown in FIG. 9, the screw compression block 42 has a small path portion 421 and a large path portion 422 that are coaxial. A step surface 423 is formed between the small path portion 421 and the large path portion 422. The compression spring 43 is sleeved on the small path portion 421. One end of the compression spring 43 abuts against the step surface 423, and the other end abuts against an inner side of the compression nut 44. The concave surface 424 is formed on one end of the large path portion 422 that is away from the small path portion 421.

To ensure that the concave surface 424 exactly matches the side surface of the angle adjustment screw 30 after assembly of the screw compression block 42 is completed, in an implementation, as shown in FIG. 9, a positioning protrusion 425 is formed on a side surface of the screw compression block 42, and a positioning groove matching the positioning protrusion 425 is formed in the nut body 41. In a process of mounting the screw compression block 42 into the nut body 41, the positioning protrusion 425 on the side surface of the screw compression block 42 is inserted into the positioning groove in the nut body 41, so that the screw compression block 42 cannot rotate, thereby realizing error prevention during assembly.

To transmit the elastic force of the compression spring 43 to the angle adjustment screw 30 more effectively, in an implementation, as shown in FIG. 8, an axis of the first threaded hole 411 is orthogonal to an axis of the second threaded hole 412. In another possible implementation, the axis of the first threaded hole 411 and the axis of the second threaded hole 412 may intersect but are not perpendicular to each other.

The linkage assembly may include any quantity of connecting rods, for example, two or more. In an implementation, as shown in FIG. 1 to FIG. 4, the linkage assembly includes a first connecting rod 171 and a second connecting rod 172. A first end of the first connecting rod 171 is hinged to the angle adjustment nut 40 around a fourth hinge axis D-D. A second end of the first connecting rod 171 is hinged to a first end of the second connecting rod 172 around a sixth hinge axis F-F. A second end of the second connecting rod 172 is hinged to the fixing bracket 160 around a fifth hinge axis E-E. The first hinge axis A-A, the fourth hinge axis D-D, the fifth hinge axis E-E, and the sixth hinge axis F-F are parallel to each other.

In an implementation, the first connecting rod 171 is hinged to the first cylinder 80 around the second hinge axis B-B, to drive, through the first connecting rod 171, the first cylinder 80 to rotate. In this case, the second connecting rod 172 supports the first connecting rod 171, to ensure the motion stability in the angle adjustment process.

In the foregoing implementation, the first connecting rod 171 has a first hinge point connected to the angle adjustment nut 40, a second hinge point connected to the first cylinder 80, and a third hinge point connected to the second connecting rod 172. To ensure the motion flexibility of the linkage assembly, in an implementation, connecting lines between the first hinge point, the second hinge point, and the third hinge point may form a triangle. Further, the first connecting rod 171 may be formed as a fork-shaped plate, the second hinge point is located in the middle of the fork-shaped plate, and the first hinge point and the third hinge point are located at two ends of the fork-shaped plate.

To further improve the motion stability in the angle adjustment process, in an implementation, as shown in FIG. 1 to FIG. 4, the steering column includes two linkage assemblys. The two linkage assemblys are respectively arranged on two sides of the angle adjustment nut 40. The first cylinder 80 is located between the two linkage assemblys. The angle adjustment nut 40 is connected to the fixing bracket 160 through the two linkage assemblys.

In the present disclosure, the first cylinder 80 and the second cylinder 90 are slidably sleeved. When the second cylinder 90 extends out, the steering shaft 60 is extended, thereby raising the steering wheel. When the second cylinder 90 retracts, the steering shaft 60 is shortened, thereby lowering the steering wheel.

For ease of adjusting the height of the steering wheel, in an implementation, as shown in FIG. 1 to FIG. 4, the steering column may further include a height adjustment motor 110 and a height adjustment screw-nut assembly. The height adjustment motor 110 is mounted on the first cylinder 80. The height adjustment motor 110 is configured to drive, through the height adjustment screw-nut assembly, the second cylinder 90 to axially move relative to the first cylinder 80.

In some embodiments, as shown in FIG. 1 to FIG. 4, the height adjustment screw-nut assembly includes a height adjustment screw 130 and a height adjustment nut 140 sleeved on the height adjustment screw 130. The height adjustment screw 130 is connected to the height adjustment motor 110, the height adjustment nut 140 is fixed on the second cylinder 90, and an axis of the height adjustment screw 130 is parallel to an axis of the second cylinder 90. When the height adjustment motor 110 is started, the height adjustment screw 130 rotates, and the height adjustment nut 140 moves along the axial direction of the height adjustment screw 130, thereby driving the second cylinder 90 to extend out or retract.

Figure 13:
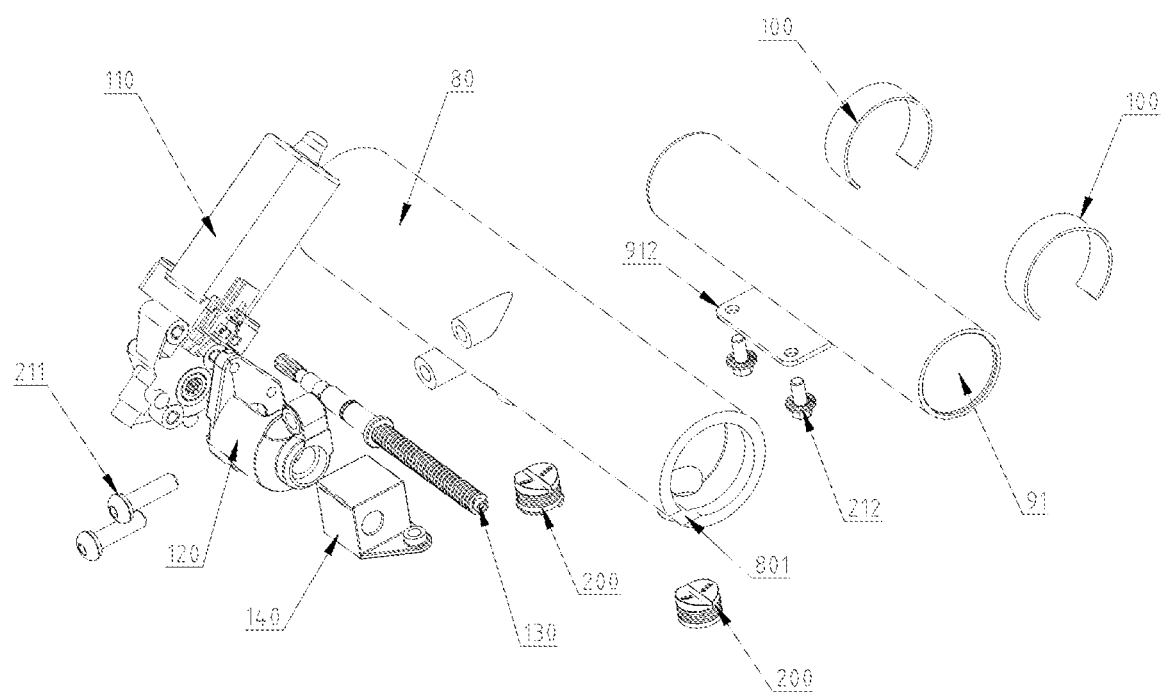
FIG. 13 is a schematic exploded view of a height adjustment module in a steering column according to an implementation of the present disclosure.
Figure 14:
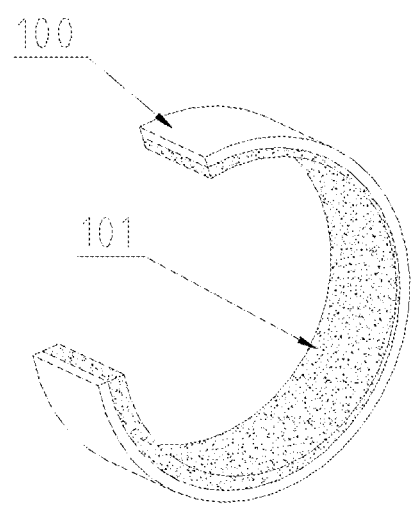
FIG. 14 is a schematic three-dimensional diagram of a sliding collar in a steering column according to an implementation of the present disclosure.
Figure 15:
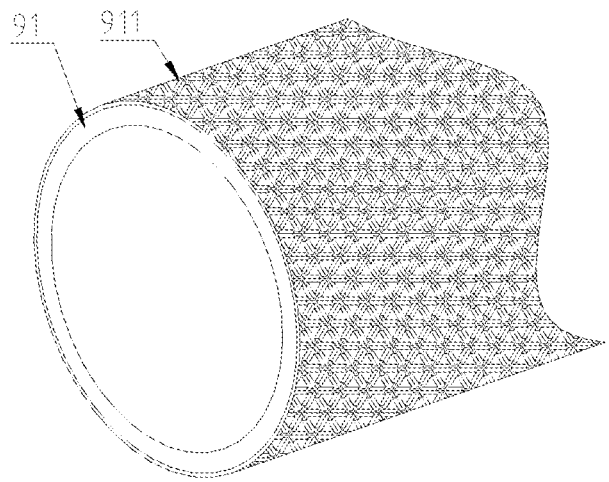
FIG. 15 is a schematic three-dimensional diagram of a sliding cylinder in a steering column according to an implementation of the present disclosure.
Figure 16:
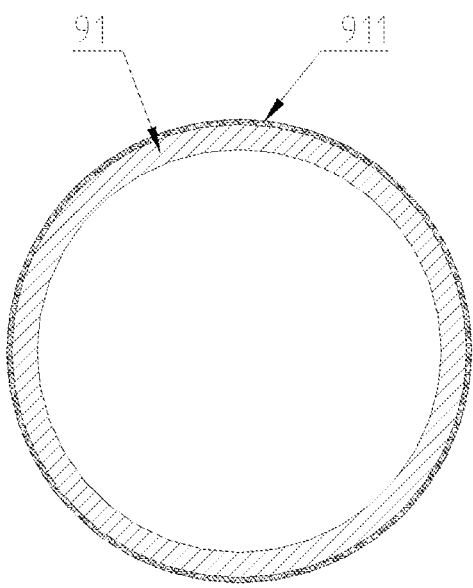
FIG. 16 is a schematic cross-sectional view of a sliding cylinder in a steering column according to an implementation of the present disclosure.

For ease of fixing the height adjustment nut 140 to the second cylinder 90, in an implementation, as shown in FIG. 13, the second cylinder 90 is provided with a connecting plate 912, and the first cylinder 80 is provided with a chute 801 extending along the axial direction of the first cylinder 80. The connecting plate 912 passes through the chute 801, and the height adjustment nut 140 is fixed on the connecting plate 912 through a second fastener 212.

For ease of mounting the height adjustment motor 110 on the first cylinder 80, in an implementation, as shown in FIG. 13, the steering column further includes a height adjustment motor base 120. The height adjustment motor 110 is fixed on the height adjustment motor base 120, and the height adjustment motor base 120 is fixed on the first cylinder 80 through a first fastener 211. To make the structure of the steering column more compact, in an implementation, along the axial direction of the first cylinder 80, the height adjustment motor base 120 is located between two end portions of the first cylinder 80.

Figure 10:
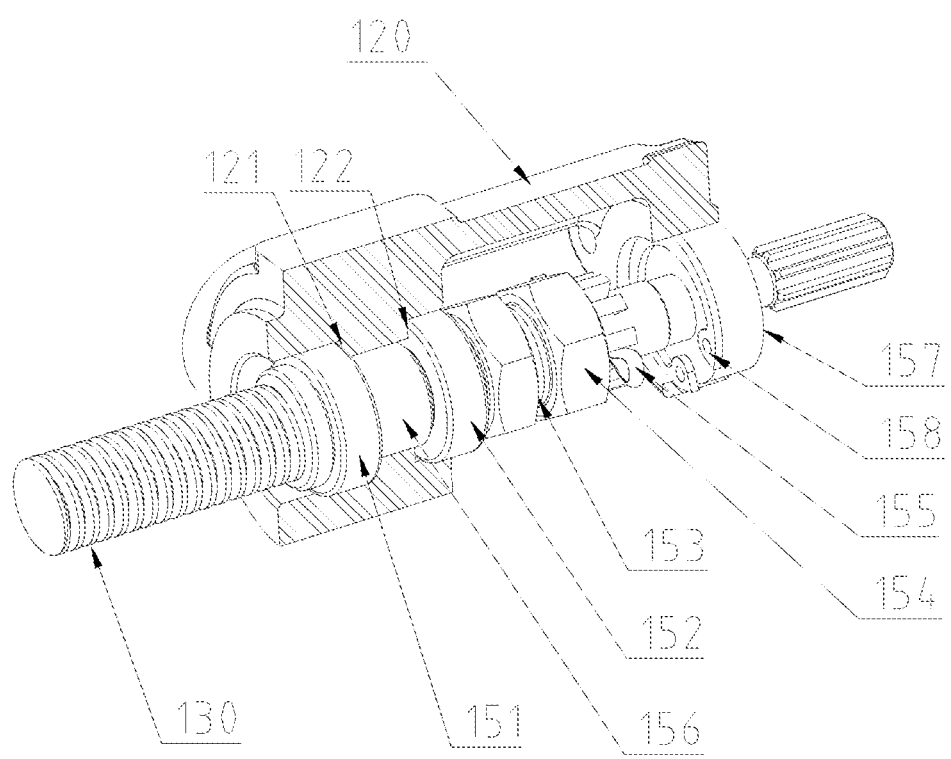
FIG. 10 is a schematic diagram of assembly of a height adjustment screw and a height adjustment motor base in a steering column according to an implementation of the present disclosure, where the height adjustment motor base is shown in a cross-sectional view to show an internal structure.
Figure 11:
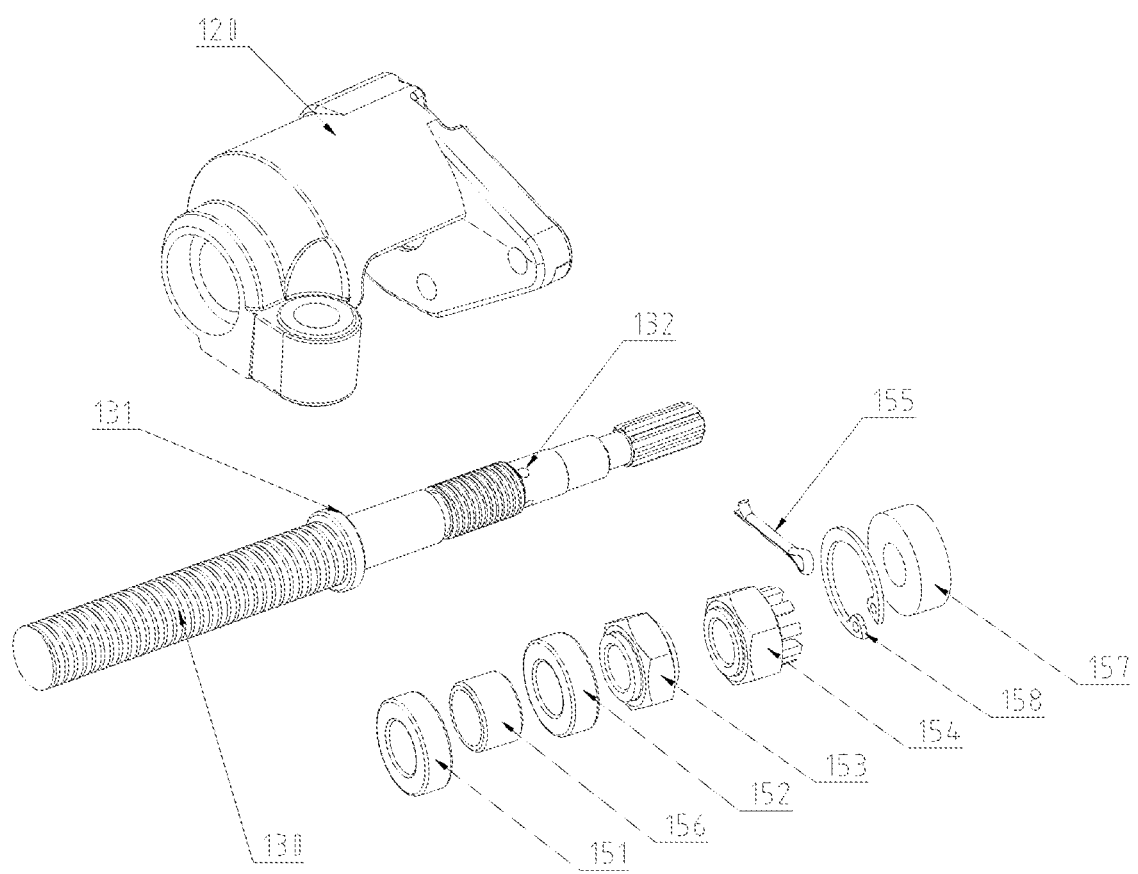
FIG. 11 is a schematic exploded view of a height adjustment screw and a height adjustment motor base in a steering column according to an implementation of the present disclosure.

As shown in FIG. 10 and FIG. 11, the height adjustment screw 130 runs through the height adjustment motor base 120. The height adjustment screw 130 is supported in the height adjustment motor base 120 through a third carrier bearing 156 and a fourth carrier bearing 157. One end of the height adjustment screw 130 extends out of the height adjustment motor base 120 and is in splined connection to the height adjustment motor 110. The other end of the height adjustment screw 130 extends out of the height adjustment motor base 120 and matches the height adjustment nut 140. The third carrier bearing 156 and the fourth carrier bearing 157 make the height adjustment screw 130 unable to move in the radial direction.

In this case, there may be an axial clearance between the height adjustment screw 130 and the height adjustment motor base 120, and the clearance may cause the following problems: 1. Abnormal noises during rotation of the height adjustment screw 130; 2. Deviation between an expected position and an actual position of the height adjustment nut 140.

To eliminate the axial clearance between the height adjustment screw 130 and the height adjustment motor base 120, so that the height adjustment screw 130 cannot move in the axial direction, in an implementation, as shown in FIG. 10 and FIG. 11, a third thrust bearing 151 is arranged on the height adjustment screw 130. The steering column further includes a second axial compression mechanism. The second axial compression mechanism applies a force to the height adjustment screw 130, so that the height adjustment screw 130 and the height adjustment motor base 120 are compressed through the third thrust bearing 151 in the axial direction. In some embodiments, a fourth limiting step 131 is formed on the height adjustment screw 130, a fifth limiting step 121 is formed on an inner wall of the height adjustment motor base 120, and two sides of the third thrust bearing 151 respectively abut against the fourth limiting step 131 and the fifth limiting step 121.

The second axial compression mechanism may have any proper structure, for example, may include a compression spring. The compression spring is arranged between the height adjustment motor base 120 and the height adjustment screw 130, and applies an elastic force in the axial direction to the height adjustment screw 130, so that the third thrust bearing 151 is clamped by the height adjustment screw 130 and the height adjustment motor base 120.

In an implementation, as shown in FIG. 10 and FIG. 11, the second axial compression mechanism includes a fourth thrust bearing 152 and a second locking nut 153 that are arranged on the height adjustment screw 130. The fourth thrust bearing 152 is located between the third thrust bearing 151 and the second locking nut 153. A sixth limiting step 122 is further formed on the inner wall of the height adjustment motor base 120. Two sides of the fourth thrust bearing 152 respectively abut against the sixth limiting step 122 and the second locking nut 153. The third thrust bearing 151 and the fourth thrust bearing 152 are located between the fourth limiting step 131 and the second locking nut 153.

Herein, the third thrust bearing 151 and the fourth thrust bearing 152 can both bear an axial force and rotate around an axis. The second locking nut 153 is in threaded fit with the height adjustment screw 130. When the second locking nut 153 is tightened, a distance between the fourth limiting step 131 and the second locking nut 153 on the height adjustment screw 130 gradually decreases. If the second locking nut 153 continues to be tightened, a clearance between the fourth limiting step 131 and the third thrust bearing 151, a clearance between the third thrust bearing 151 and the fifth limiting step 121, a clearance between the sixth limiting step 122 and the fourth thrust bearing 152, and a clearance between the fourth thrust bearing 152 and the second locking nut 153 will be minimized, that is, there will be no clearance.

To prevent the second locking nut 153 from loosening due to rotation of the height adjustment screw 130, further, as shown in FIG. 10 and FIG. 11, the second axial compression mechanism further includes a second slotted nut 154 and a second cotter 155 that are arranged on the height adjustment screw 130. One side of the second locking nut 153 that faces away from the fourth thrust bearing 152 is fixed through the second slotted nut 154, and the second slotted nut 154 is fixed through the second cotter 155. After the second locking nut 153 is tightened, the second slotted nut 154 is then tightened, and the second cotter 155 is made to penetrate the second slotted nut 154 and is inserted into a second pin hole 132 reserved on the height adjustment screw 130. The second slotted nut 154 is blocked by the second cotter 155 and will not loosen. Similarly, the second locking nut 153 is blocked by the second slotted nut 154 and will not loosen.

The third carrier bearing 156 and the fourth carrier bearing 157 may be arranged at any proper positions. In an implementation, as shown in FIG. 10 and FIG. 11, the third carrier bearing 156 is located between the third thrust bearing 151 and the fourth thrust bearing 152. The fourth thrust bearing 152, the second locking nut 153, and the second slotted nut 154 are located between the third carrier bearing 156 and the fourth carrier bearing 157. One side of the fourth carrier bearing 157 that faces toward the third carrier bearing 156 may be fixed through a second limiting retainer ring 158. The second limiting retainer ring 158 is mounted on the inner wall of the height adjustment motor base 120. One side of the fourth carrier bearing 157 that faces away from the third carrier bearing 156 may be limited by the height adjustment motor 110.

In the height adjustment process, relative sliding is generated between the first cylinder 80 and the second cylinder 90, and due to the impact of a friction coefficient between components, the relative sliding between the two inevitably generates noises. To reduce the noises in the height adjustment process, in an implementation, as shown in FIG. 12 to FIG. 16, the first cylinder 80 and the second cylinder 90 may be slidably sleeved through a sliding collar 100. The sliding collar 100 is mounted in the first cylinder 80 and sleeved on the second cylinder 90. Relative positions of the sliding collar 100 and the first cylinder 80 are fixed. An inner wall of the sliding collar 100 is coated with a first anti-friction coating 101, and an outer wall of the second cylinder 90 is coated with a second anti-friction coating 911. When the height adjustment motor 110 works, the height adjustment nut 140 moves on the height adjustment screw 130, and drives the second cylinder 90 to slide in the first cylinder 80, thereby implementing the height adjustment function of the steering column.

By coating the inner wall of the sliding collar 100 with the first anti-friction coating 101 and coating the outer wall of the second cylinder 90 with the second anti-friction coating 911, a friction coefficient between the sliding collar 100 and the second cylinder 90 can be reduced, thereby reducing noises generated during relative sliding between the two.

Herein, the first anti-friction coating 101 and the second anti-friction coating 911 may be any proper anti-friction material. For example, one or more of free polyamide, polyoxymethylene, polytetrafluoroethylene, and expanded polytetrafluoroethylene may be selected.

To improve an adhesion rate of the anti-friction material, in an implementation, the first anti-friction coating 101 may include a copper net.

Figure 17:
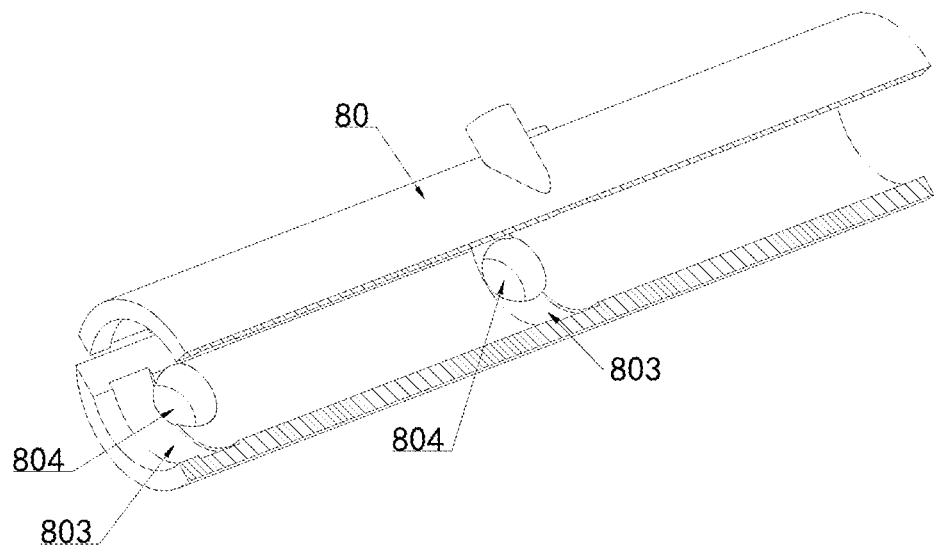
FIG. 17 is a schematic three-dimensional diagram of a first cylinder in a steering column according to an implementation of the present disclosure, where the first cylinder is shown in a cross-sectional view to show an internal structure.

The sliding collar 100 may be mounted in the first cylinder 80 in any proper manner, for example, welded or riveted with the first cylinder 80. In an implementation, as shown in FIG. 17, an annular mounting groove 803 is formed on an inner wall of the first cylinder 80, and the sliding collar 100 is embedded in the annular mounting groove 803.

Figure 12:
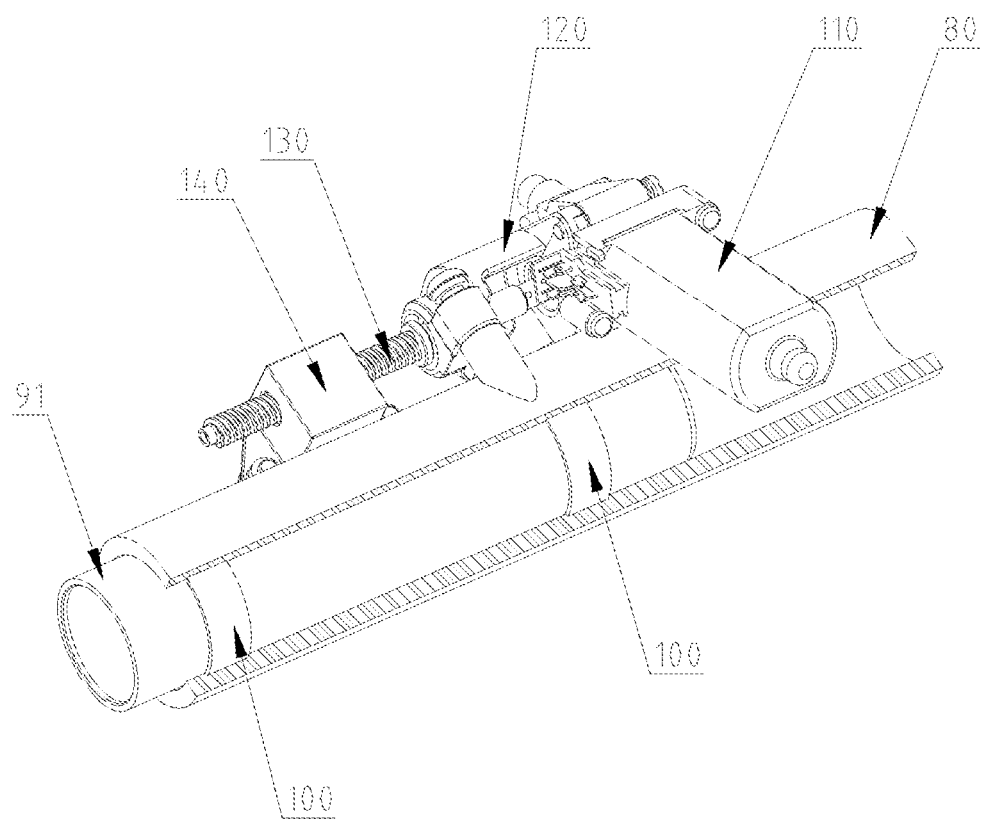
FIG. 12 is a schematic diagram of assembly of a height adjustment module in a steering column according to an implementation of the present disclosure, where a first cylinder is shown in a cross-sectional view to show an internal structure.

To stably support the second cylinder 90 in the first cylinder 80 and prevent the second cylinder 90 from shaking in the first cylinder 80, in an implementation, as shown in FIG. 12 and FIG. 13, there are two sliding collars 100, and the two sliding collars 100 are spaced along the axial direction of the first cylinder 80.

The second cylinder 90 may be a single component, or may be an assembly formed by a plurality of components. This is not limited in the present disclosure.

To improve the crash safety of the steering column, in an implementation, as shown in FIG. 19 to FIG. 22, the second cylinder 90 includes a sliding cylinder 91 and a collapse cylinder 92 nested with each other.

In this case, the upper shaft 61 of the steering shaft 60 is supported in the collapse cylinder 92 through the first bearing 71, and the lower shaft 62 of the steering shaft 60 is supported in the first cylinder 80 through the second bearing 72. The height adjustment nut 140 is connected to the sliding cylinder 91, the sliding collar 100 is sleeved on the sliding cylinder 91, the connecting plate 912 is provided on the sliding cylinder 91, and the second anti-friction coating 911 is provided on an outer wall of the sliding cylinder 91. During assembly, the collapse cylinder 92 is pressed from one end of the sliding cylinder 91 to be assembled into the sliding cylinder 91. In the press-in assembling process, a press-in force is monitored simultaneously. After the assembly is completed, the monitored press-in force is a collapse force during collapse.

In normal cases, the collapse cylinder 92 and the sliding cylinder 91 are fixed together without relative movement. When the height adjustment motor 110 works, the second cylinder 90 axially moves relative to the first cylinder 80 as a whole. When a frontal collision of the vehicle occurs, the sliding cylinder 91 does not move, and a collision force causes the collapse cylinder 92 to axially move in the sliding cylinder 91. During the movement, the collapse cylinder 92 undergoes collapse deformation to absorb collision energy, thereby reducing damage to the driver.

For ease of controlling the collapse deformation of the collapse cylinder 92, in an implementation, the second cylinder 90 further includes a collapse ring 93. The collapse ring 93 is mounted in the sliding cylinder 91, and the collapse ring 93 is sleeved on the collapse cylinder 92 and is in compressed fit with the collapse cylinder 92. During assembly, the collapse ring 93 is first mounted to a predetermined mounting position in the sliding cylinder 91. After the assembly is completed, the collapse ring 93 cannot move in the sliding cylinder 91. Then, the collapse cylinder 92 is pressed from one end of the sliding cylinder 91 to be assembled into the sliding cylinder 91. In the press-in assembling process, a press-in force is monitored simultaneously. After the assembly is completed, the monitored press-in force is a collapse force during collapse. When a frontal collision of the vehicle occurs, the sliding cylinder 91 does not move, and a collision force causes the collapse cylinder 92 to axially move in the sliding cylinder 91. During the movement, a surface of the collapse cylinder 92 is scratched by the collapse ring 93 and undergoes collapse deformation to absorb collision energy, thereby reducing damage to the driver.

Figure 22:
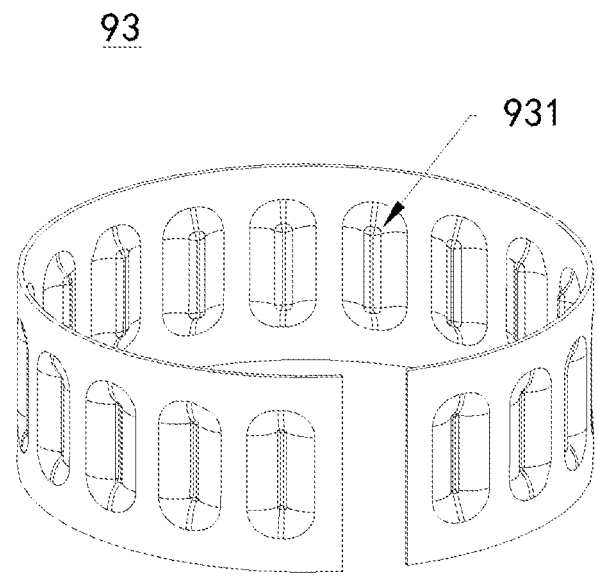
FIG. 22 is a schematic three-dimensional diagram of a collapse ring in a steering column according to an implementation of the present disclosure.

To increase the collapse effect, in an implementation, as shown in FIG. 22, a plurality of protrusions 931 protruding inward are formed on the collapse ring 93. When the collapse cylinder 92 axially moves relative to the sliding cylinder 91, the protrusions 931 on the collapse ring 93 form scratches on the surface of the collapse cylinder 92, causing collapse deformation to the collapse cylinder 92. A magnitude of the collapse force may be changed by adjusting the quantity and height of the protrusions on the collapse ring 93 until a design requirement is met. Since the collapse ring 93 is a component that directly affects the collapse force, after the size and characteristics of the collapse ring 93 are finalized, the magnitude of the collapse force is basically determined. Therefore, in this manner, consistency of the collapse force is high.

To ensure that the collapse ring 93 can scratch the surface of the collapse cylinder 92, the material hardness of the collapse ring 93 may be greater than the material hardness of the collapse cylinder 92.

Figure 21:
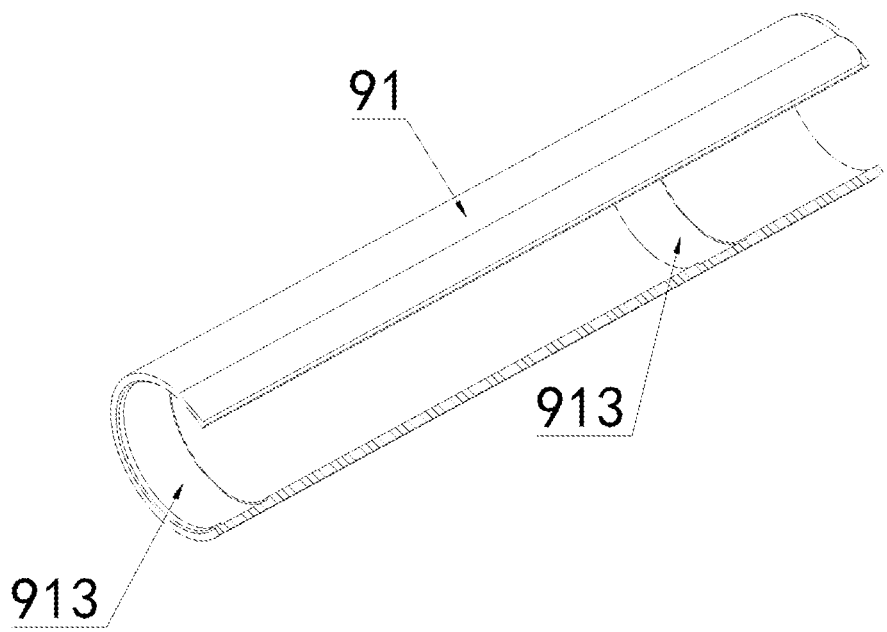
FIG. 21 is a schematic three-dimensional diagram of a sliding cylinder in a steering column according to an implementation of the present disclosure, where the sliding cylinder is shown in a cross-sectional view to show an internal structure.

The collapse ring 93 may be mounted in the sliding cylinder 91 in any proper manner, for example, welded or riveted with the sliding cylinder 91. In an implementation, as shown in FIG. 21, an annular positioning groove 913 is formed on an inner wall of the sliding cylinder 91, and the collapse ring 93 is embedded in the annular positioning groove 913.

Figure 19:
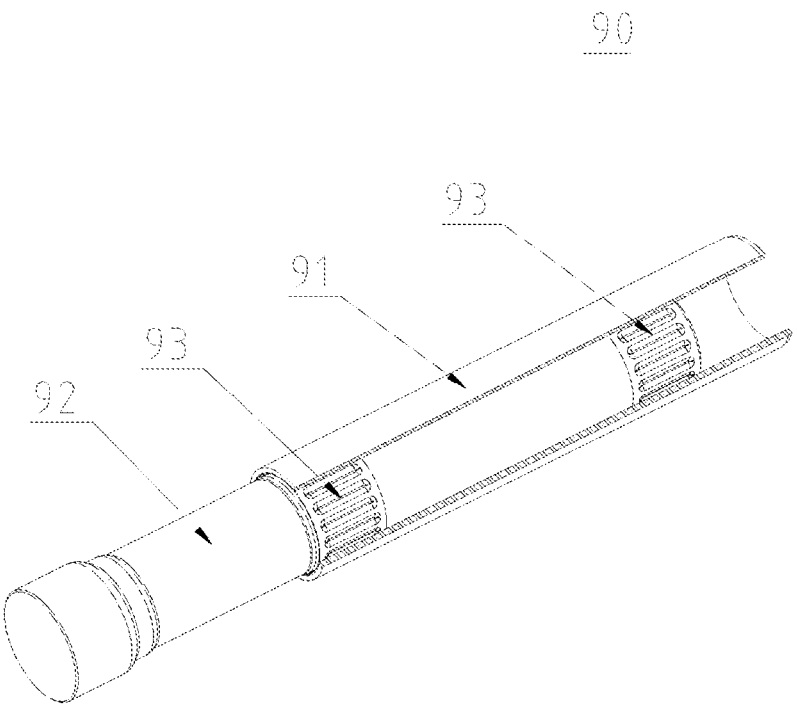
FIG. 19 is a schematic diagram of assembly of a second cylinder in a steering column according to an implementation of the present disclosure, where a sliding cylinder is shown in a cross-sectional view to show an internal structure.
Figure 20:
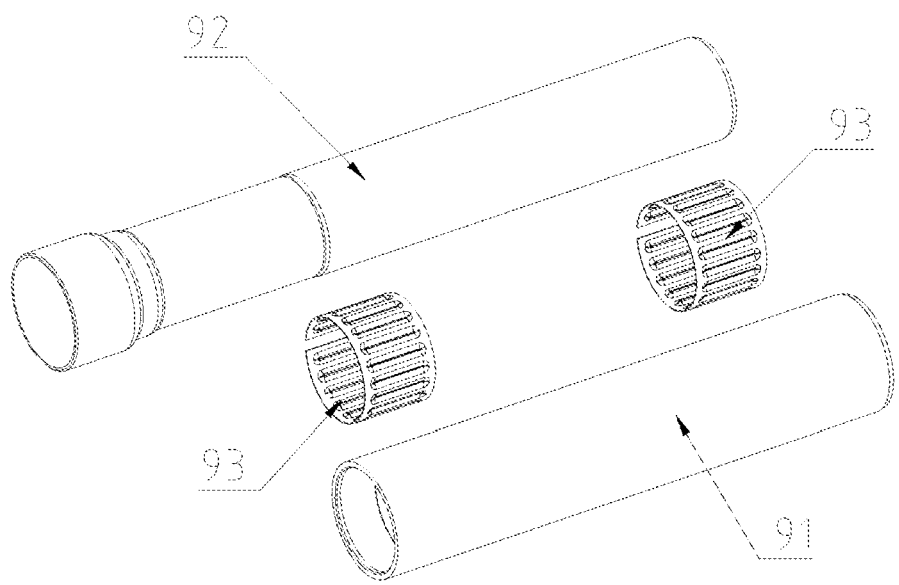
FIG. 20 is a schematic exploded view of a second cylinder in a steering column according to an implementation of the present disclosure.

To increase the collapse effect and prevent the collapse cylinder 92 from shaking in the sliding cylinder 91, in an implementation, as shown in FIG. 19 and FIG. 20, there are two collapse rings 93, and the two collapse rings 93 are spaced along the axial direction of the sliding cylinder 91.

To eliminate a clearance between the sliding cylinder 91 and the sliding collar 100 and reduce shaking, in an implementation, as shown in FIG. 13, a compression mechanism 200 is provided on the first cylinder 80. The compression mechanism 200 applies a radial force to a side surface of the sliding cylinder 91 to compress the sliding cylinder 91 to the sliding collar 100.

Figure 18:
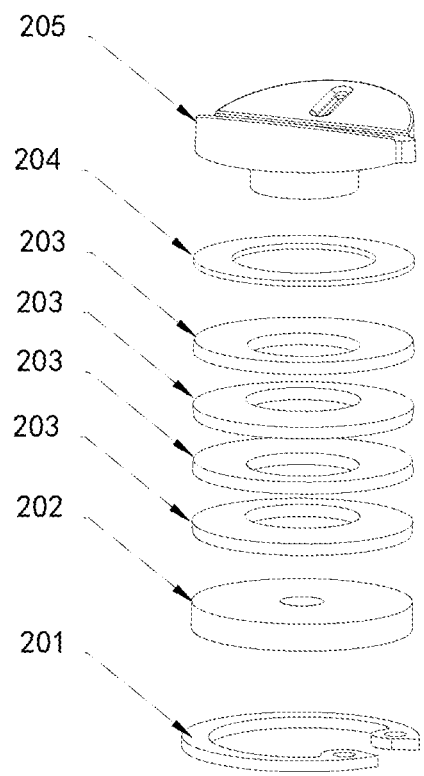
FIG. 18 is a schematic exploded view of a compression mechanism in a steering column according to an implementation of the present disclosure.

Further, as shown in FIG. 17 and FIG. 18, a mounting hole 804 is provided on a side wall of the first cylinder 80, and the compression mechanism 200 is arranged in the mounting hole 804. The compression mechanism 200 includes a circlip 201, a disc spring compression piece 202, a plurality of disc springs 203, a gasket 204, and a compression block 205 that are sequentially arranged in a laminated mode. The circlip 201 is clamped to an inner wall of the mounting hole 804, the plurality of disc springs 203 are arranged in a laminated mode and compressed between the disc spring compression piece 202 and the gasket 204, and the compression block 205 abuts against the side surface of the sliding cylinder 91. An elastic force of the disc spring 203 is transmitted to the sliding cylinder 91 through the compression block 205, and to compress the sliding cylinder 91 and the sliding collar 100.

In addition to the components described above, as shown in FIG. 2 and FIG. 4, the steering column of the present disclosure may further include an adjustment controller 180. The adjustment controller 180 is mounted on the first cylinder 80. The adjustment controller 180 is connected to the angle adjustment motor 10 through a first bundle 191, and the adjustment controller 180 is connected to the height adjustment motor 110 through a second bundle 192.

To make the overall structure of the steering column more compact and occupy less space, in an implementation, as shown in FIG. 2 and FIG. 4, along the axial direction of the first cylinder 80, the adjustment controller 180 is located between two end portions of the first cylinder 80. The fixing bracket 160, the angle adjustment screw-nut assembly, the height adjustment screw-nut assembly, and the adjustment controller 180 are distributed around the first cylinder 80, that is, the fixing bracket 160, the angle adjustment screw-nut assembly, the height adjustment screw-nut assembly, and the adjustment controller 180 surround the first cylinder 80.

The following briefly describes a working process of angle adjustment and height adjustment of the steering column according to an implementation of the present disclosure.

After receiving an angle adjustment signal, the adjustment controller 180 drives an internal circuit, and transmits the drive signal to the angle adjustment motor 10 through the first bundle 191. The angle adjustment motor 10 starts to rotate after receiving the drive signal. After rotating, the angle adjustment motor 10 transmits a self-generated torque to the angle adjustment screw 30, to drive the angle adjustment screw 30 to rotate together. There is a screw-nut pair between the angle adjustment screw 30 and the angle adjustment nut 40. When the angle adjustment screw 30 rotates, the angle adjustment nut 40 moves along the axis of the angle adjustment screw 30. When moving along the angle adjustment screw 30, the angle adjustment nut 40 also drives the first connecting rod 171 to rotate. The rotation of the first connecting rod 171 drives the second connecting rod 172 to rotate around the fifth hinge axis E-E, and simultaneously drives the first cylinder 80 to rotate around the first hinge axis A-A, thereby implementing the angle adjustment function of the steering column.

After receiving a height adjustment signal, the adjustment controller 180 drives an internal circuit, and transmits the drive signal to the height adjustment motor 110 through the second bundle 192. The height adjustment motor 110 starts to rotate after receiving the drive signal. After rotating, the height adjustment motor 110 transmits a self-generated torque to the height adjustment screw 130, to drive the height adjustment screw 130 to rotate together. There is a screw-nut pair between the height adjustment screw 130 and the height adjustment nut 140. When the height adjustment screw 130 rotates, the height adjustment nut 140 moves along the axis of the height adjustment screw 130. The height adjustment nut 140 and the second cylinder 90 are fixedly connected. When the height adjustment nut 140 moves, the second cylinder 90 moves together, thereby implementing the height adjustment function of the steering column.

According to another aspect of the present disclosure, a vehicle is provided. The vehicle includes the steering column described above.

Although specific implementations of the present disclosure are described in detail above with reference to accompanying drawings, the present disclosure is not limited to specific details in the foregoing implementations. Various simple variations can be made to the technical solutions of the present disclosure within the scope of the technical idea of the present disclosure, and such simple variations all fall within the protection scope of the present disclosure.

It should be further noted that the specific technical features described in the above specific implementations may be combined in any suitable manner provided that no conflict occurs. To avoid unnecessary repetition, various possible combination manners are not further described in the present disclosure.

In addition, various different implementations of the present disclosure may alternatively be combined randomly. Such combinations should also be considered as the content disclosed in the present disclosure provided that these combinations do not depart from the idea of the present disclosure.

What is claimed is:

1. A steering column, comprising:
   a steering shaft, a fixing bracket, a first cylinder, a second cylinder, an angle adjustment motor, an angle adjustment screw-nut assembly, a linkage assembly, a height adjustment motor, and a height adjustment screw-nut assembly, wherein:
   the second cylinder is arranged in the first cylinder and is slidably sleeved with the first cylinder,
   the steering shaft runs through the first cylinder and the second cylinder,
   the steering shaft comprises an upper shaft and a lower shaft that are in splined connection,
   the upper shaft is supported in the second cylinder through a first bearing,
   the lower shaft is supported in the first cylinder through a second bearing,
   the first cylinder is hinged to the fixing bracket around a first hinge axis,
   the angle adjustment motor is configured to drive, through the angle adjustment screw-nut assembly and the linkage assembly, the first cylinder to rotate relative to the fixing bracket,
   the height adjustment motor is configured to drive, through the height adjustment screw-nut assembly, the second cylinder to axially move relative to the first cylinder,
   the angle adjustment screw-nut assembly comprises an angle adjustment screw and an angle adjustment nut sleeved on the angle adjustment screw,
   the angle adjustment screw is connected to the angle adjustment motor,
   the angle adjustment nut is connected to the fixing bracket through the linkage assembly,
   a connecting rod of the linkage assembly is hinged to the first cylinder around a second hinge axis,
   the first hinge axis is parallel to the second hinge axis, and
   a first end of the angle adjustment screw extends out of the angle adjustment motor base and is in splined connection to the angle adjustment motor.

2. The steering column according to claim 1, wherein an axis of the angle adjustment screw is perpendicular to the first hinge axis.

3. The steering column according to claim 1, wherein the steering column further comprises an angle adjustment motor base, the angle adjustment motor is fixed on the angle adjustment motor base, the angle adjustment motor base is hinged to the first cylinder around a third hinge axis, and the third hinge axis is parallel to the first hinge axis.

4. The steering column according to claim 1, wherein the linkage assembly comprises a first connecting rod and a second connecting rod; a first end of the first connecting rod is hinged to the angle adjustment nut around a fourth hinge axis; a second end of the first connecting rod is hinged to a first end of the second connecting rod around a sixth hinge axis; a second end of the second connecting rod is hinged to the fixing bracket around a fifth hinge axis; the first hinge axis, the fourth hinge axis, the fifth hinge axis, and the sixth hinge axis are parallel to each other; and the first connecting rod is hinged to the first cylinder around the second hinge axis.

5. The steering column according to claim 4, wherein the first connecting rod has a first hinge point connected to the angle adjustment nut, a second hinge point connected to the first cylinder, and a third hinge point connected to the second connecting rod, wherein connecting lines between the first hinge point, the second hinge point, and the third hinge point form a triangle.

6. The steering column according to claim 1, further comprising a second linkage assembly, wherein the linkage assembly and the second linkage assembly are respectively arranged on two sides of the angle adjustment nut.

7. The steering column according to claim 1, wherein the height adjustment screw-nut assembly comprises a height adjustment screw and a height adjustment nut sleeved on the height adjustment screw, wherein the height adjustment screw is connected to the height adjustment motor, the height adjustment nut is connected to the second cylinder, and an axis of the height adjustment screw is parallel to an axis of the second cylinder.

8. The steering column according to claim 7, wherein the steering column further comprises a height adjustment motor base, the height adjustment motor is fixed on the height adjustment motor base, and the height adjustment motor base is fixed on the first cylinder.

9. A vehicle, comprising the steering column according to claim 1.

10. The steering column according to claim 1, wherein a first end of the first cylinder is hinged to the fixing bracket, and a connecting rod of the linkage assembly is hinged to a second end of the first cylinder.

11. The steering column according to claim 1, wherein the angle adjustment screw-nut assembly is configured to convert rotary motion of the angle adjustment motor into rectilinear motion of the angle adjustment nut.

12. The steering column according to claim 1, wherein a second end of the angle adjustment screw extends out of the angle adjustment motor base and is in threaded fit with the angle adjustment nut.

13. The steering column according to claim 3, wherein the angle adjustment screw is supported in the angle adjustment motor base through a first carrier bearing and a second carrier bearing.

14. The steering column according to claim 13, wherein the first carrier bearing and the second carrier bearing are configured to prevent the angle adjustment screw from moving radially.

15. The steering column according to claim 3, a mounting lug is formed on the first cylinder and the angle adjustment motor base is hinged to a mounting lug around the third hinge axis.

16. A steering column, comprising:
    a steering shaft, a fixing bracket, a first cylinder, a second cylinder, an angle adjustment motor, an angle adjustment screw-nut assembly, a linkage assembly, a height adjustment motor, and a height adjustment screw-nut assembly, wherein:

the second cylinder is arranged in the first cylinder and is slidably sleeved with the first cylinder, the steering shaft runs through the first cylinder and the second cylinder, the steering shaft comprises an upper shaft and a lower shaft that are in splined connection, the upper shaft is supported in the second cylinder through a first bearing, the lower shaft is supported in the first cylinder through a second bearing, the first cylinder is hinged to the fixing bracket around a first hinge axis, the angle adjustment motor is configured to drive, through the angle adjustment screw-nut assembly and the linkage assembly, the first cylinder to rotate relative to the fixing bracket, the height adjustment motor is configured to drive, through the height adjustment screw-nut assembly, the second cylinder to axially move relative to the first cylinder, the angle adjustment screw-nut assembly comprises an angle adjustment screw and an angle adjustment nut sleeved on the angle adjustment screw, the angle adjustment screw is connected to the angle adjustment motor, the angle adjustment nut is connected to the fixing bracket through the linkage assembly, a connecting rod of the linkage assembly is hinged to the first cylinder around a second hinge axis, the first hinge axis is parallel to the second hinge axis, the steering column further comprises an angle adjustment motor base, the angle adjustment motor is fixed on the angle adjustment motor base, the angle adjustment motor base is hinged to the first cylinder around a third hinge axis, the third hinge axis is parallel to the first hinge axis, a first thrust bearing is arranged on the angle adjustment screw, and the angle adjustment screw and the angle adjustment motor base are axially compressed through the first thrust bearing.

17. The steering column according to claim 16, wherein a first limiting step is formed on the angle adjustment screw, a second limiting step is formed on an inner wall of the angle adjustment motor base, and two sides of the first thrust bearing respectively abut against the first limiting step and the second limiting step.

18. The steering column according to claim 16, wherein a compression spring is arranged between the angle adjustment motor base and the angle adjustment screw, and configured to apply an elastic force in an axial direction to the angle adjustment screw so that the first thrust bearing is clamped by the angle adjustment screw and the angle adjustment motor base.

* * * * *